United States Patent
Madey et al.

(10) Patent No.: US 10,412,169 B1
(45) Date of Patent: *Sep. 10, 2019

(54) SYSTEMS AND METHODS FOR IDENTIFYING UNIDENTIFIED PLUMBING SUPPLY PRODUCTS

(71) Applicant: STATE FARM MUTUAL AUTOMOBILE INSURANCE COMPANY, Bloomington, IL (US)

(72) Inventors: Taryn M. Madey, Apex, NC (US); Joshua M. Mast, Bloomington, IL (US); Sharon Gibson, Carlock, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/852,268

(22) Filed: Dec. 22, 2017

Related U.S. Application Data

(63) Continuation of application No. 15/013,362, filed on Feb. 2, 2016, now Pat. No. 9,923,971.

(60) Provisional application No. 62/110,908, filed on Feb. 2, 2015.

(51) Int. Cl.
| | | |
|---|---|---|
| G06K 9/22 | (2006.01) | |
| G06K 9/62 | (2006.01) | |
| H04L 29/08 | (2006.01) | |
| G06K 9/00 | (2006.01) | |

(52) U.S. Cl.
CPC ...... *H04L 67/1097* (2013.01); *G06K 9/00979* (2013.01); *G06K 9/228* (2013.01); *G06K 2209/19* (2013.01)

(58) Field of Classification Search
CPC .............. G06K 9/00979; G06K 9/228; G06K 2209/19; H04L 67/1097
See application file for complete search history.

(56) References Cited

U.S. PATENT DOCUMENTS

| | | | |
|---|---|---|---|
| 9,619,691 | B2 | 4/2017 | Pang et al. |
| 9,721,302 | B2 * | 8/2017 | Tofte ...................... G06Q 40/08 |
| 9,923,971 | B2 * | 3/2018 | Madey ............... G06K 9/00979 |
| 2009/0237546 | A1 | 9/2009 | Bloebaum et al. |
| 2013/0322764 | A1 | 12/2013 | Li et al. |

\* cited by examiner

*Primary Examiner* — Jon Chang
(74) *Attorney, Agent, or Firm* — Marshall, Gerstein & Borun LLP; Randall G. Rueth

(57) ABSTRACT

Methods and systems for identifying an unidentified plumbing supply product are provided. According to certain aspects, an application executing on an electronic device may be configured to capture image data encoding an image of the unidentified plumbing supply product therein. The application may cause the electronic device to transmit the image data to an identification server. The identification server may analyze the image data to determine the unidentified plumbing supply product encoded in the image data matches a known plumbing supply product in a plumbing supply products database. The identification server may then transmit an indication to the electronic device that the unidentified plumbing supply product was successfully identified. The identification of the unidentified plumbing supply product may be used to process and/or subrogate an insurance claim.

19 Claims, 8 Drawing Sheets

SYSTEMS AND METHODS FOR IDENTIFYING UNIDENTIFIED PLUMBING SUPPLY PRODUCTS

CROSS-REFERENCE TO RELATED APPLICATIONS

This application is a continuation of U.S. patent application Ser. No. 15/013,362, entitled "Systems and Methods for Identifying Unidentified Plumbing Supply Products," filed on Feb. 2, 2016, and which claims the benefit of U.S. Provisional Patent Application No. 62/110,908, entitled "Systems and Methods for Identifying Unidentified Plumbing Supply Products," filed on Feb. 2, 2015, the entire disclosures of both of which are hereby incorporated herein by reference.

FIELD OF THE DISCLOSURE

The present disclosure generally relates to identifying an unidentified plumbing supply product, more particularly to the use of image recognition techniques to identify an unidentified plumbing supply line.

BACKGROUND

Homeowner and/or rental insurance exists to provide financial protection against damage to one's home and the property therein. One source of home and/or property damage relates to faulty plumbing supply products (e.g., a ruptured supply line leaking). If the fault in the plumbing supply product is due to a manufacturer defect, then an insurance provider for the home and/or property may pursue subrogation against a product manufacturer for damage associated with a corresponding insurance claim. However, in order to pursue subrogation against the product manufacturer, the product manufacturer, the identity of the plumbing supply product, and the age of the plumbing supply product have to be determined.

In the past identifying the faulty plumbing supply product involved sending a plumbing products expert to inspect the damaged home and/or property personally. The plumbing expert would rely on his non-ordinary knowledge in order identify the plumbing supply product and manufacturer. This process is slow and expensive, as there are few experts that specialize in plumbing supply product identification.

SUMMARY

The present embodiments may, inter alia, automatically identify an unidentified plumbing supply product using computer learning and/or vision techniques. The present embodiments may further enable an insurance provider process an insurance claim without the need for coordinating a site visit by a plumbing supply product expert to identify an unidentified plumbing supply product.

In one aspect, a method for enabling a user to identify an unidentified plumbing supply product may be provided. The method may be facilitated via an application executing on an electronic device. The electronic device may include one or more processors, a memory coupled to the one or more processors and a camera configured to capture images including the unidentified plumbing supply product encoded therein. The method may comprise (1) causing the one or more processors to display an interface in the application executing on the electronic device, the interface for selection to begin a plumbing supply product identification process; (2) receiving an input at the one or more processors, from the user via the application, indicating a selection to begin the plumbing supply product identification process; (3) the application causing the one or more processors to activate the electronic device's camera for capturing a first image of the unidentified plumbing supply product, wherein the unidentified plumbing supply product is associated with an insurance claim; (4) the application causing the camera to capture the first image, displayed in the application, of the unidentified plumbing supply product; (5) the application causing the one or more processors to transmit from the electronic device, over a communications network to an identification server associated with an insurance provider, the first image of the unidentified plumbing supply product; (6) receiving a notification, at the electronic device over the communications network, indicating that the unidentified plumbing supply product has been successfully identified; and (7) in response to receiving the notification that the unidentified plumbing supply product has been successfully identified, causing the one or more processors to display in the application an indication that the unidentified plumbing supply product has been successfully identified. The method may include additional, fewer, or alternate actions, including those discussed elsewhere herein.

In another aspect, a computer-implemented method for identifying an unidentified plumbing supply product associated with an insurance claim may be provided. The method may comprise (1) determining, by one or more processors, that an identity of the unidentified plumbing supply product is required; (2) generating, by the one or more processors, a first request to capture identifying information corresponding to the unidentified plumbing supply product; (3) transmitting, via a communications network to an electronic device corresponding to an individual associated with the insurance claim, the first request to capture the identifying information; (4) receiving, via the communications network, a first set of image data encoding an image of the unidentified plumbing supply product therein; (5) analyzing, by the one or more processors, the first set of image data to generate a first set of descriptors representative of the unidentified plumbing supply product, wherein each descriptor is a numerical vector representative of an aspect of a set of image data; (6) comparing, by the one or more processors, the first set of descriptors to a plurality of stored descriptors; (7) determining, by the one or more processors, that the first set of descriptors indicates that the unidentified plumbing supply product matches a particular plumbing supply product stored in a plumbing supply product database, wherein the plumbing supply product database includes data representative of a plurality of known plumbing supply products; and (8) transmitting, via the communication network to the electronic device associated with the individual, a notification that the unidentified plumbing supply product has been successfully identified. The method may include additional, fewer, or alternate actions, including those discussed elsewhere herein.

In still another aspect, a system method for enabling a user to identify an unidentified plumbing supply product may be provided. The system may comprise a communication network, one or more electronic devices, wherein each electronic device comprises one or more processors, a memory coupled to the one or more processors and a camera configured to capture images including the unidentified plumbing supply product encoded therein, and one or more servers communicatively coupled to the communication network and the one or more electronic devices. The system may further comprise one of the one or more electronic devices having an application stored thereon, wherein the application is configured to (1) cause the one or more processors to display an interface in the application executing on the electronic device, the interface for selection to begin a plumbing supply product identification process; (2) receive an input at the one or more processors, from the user via the application, indicating a selection to begin the plumbing supply product identification process; (3) cause the one or more processors to activate the electronic device's camera for capturing an image of the unidentified plumbing supply product, wherein the unidentified plumbing supply product is associated with an insurance claim; (4) cause the camera to capture the image, displayed in the application, of the unidentified plumbing supply product; (5) cause the one or more processors to transmit from the electronic device, over the communications network to an identification server associated with an insurance provider, the image of the unidentified plumbing supply product; (6) receive a notification, at the electronic device over the communications network, indicating that the unidentified plumbing supply product has been successfully identified; and (7) in response to receiving the notification that the unidentified plumbing supply product has been successfully identified, cause the one or more processors to display in the application an indication that the unidentified plumbing supply product has been successfully identified. The system may include additional, less, or alternate components and functionality, including that discussed elsewhere herein.

In yet another aspect, a system method for identifying a plurality of unidentified plumbing supply products may be provided. The system may comprise a communication network, one or more electronic devices, wherein each electronic device comprises one or more processors, a memory coupled to the one or more processors and a camera configured to capture images including at least one of the plurality of unidentified plumbing supply products encoded therein, and one or more servers communicatively coupled to the communication network and the one or more electronic devices. The system may further comprise one of the one or more servers having an application stored thereon, wherein the application is configured to (1) receive, via the communications network, a plurality of sets of image data encoding an image of one of the plurality of unidentified plumbing supply products therein; (2) analyze, by the one or more processors, the plurality of sets of image data to generate a plurality of sets of descriptors representative of the plurality of unidentified plumbing supply products, wherein each descriptor is a numerical vector representative of an aspect of a set of image data; (3) compare, by the one or more processors, the plurality of sets of descriptors to a plurality of stored descriptors; (4) determine, by the one or more processors, that at least one of the plurality of sets of descriptors indicates that a respective at least one of the plurality of unidentified plumbing supply products matches a plumbing supply product stored in a plumbing supply product database, wherein the plumbing supply product database includes data representative of a plurality of known plumbing supply products; and (5) transmit, via the communication network to the plurality of electronic devices corresponding to at least one of the plurality of unidentified plumbing supply products, a notification that the respective at least one of the plurality of unidentified plumbing supply products has been successfully identified. The system may include additional, less, or alternate components and functionality, including that discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

Figure 1:
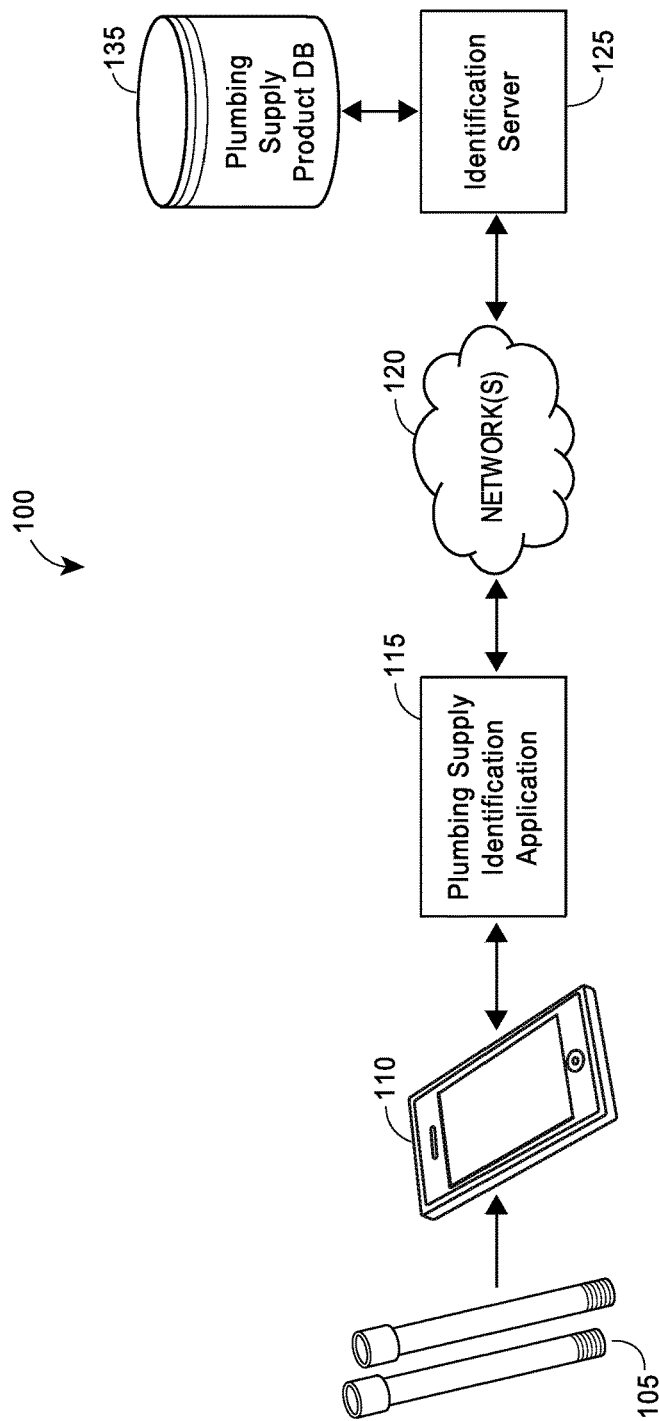
FIG. 1 depicts an example environment including components and entities associated with identifying an unidentified plumbing supply product, in accordance with some embodiments.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, identifying an unidentified plumbing supply product, such as a plumbing hose, supply line, faucet, coupling, and/or any other plumbing supply product. The present embodiments may further relate to maintaining a database of known plumbing supply products. The database may be organized by manufacturer, product and/or product family. For example, Acme Co. may have released a plurality of different pipes in their AcmeX line of plumbing supply lines. The database may be organized to identify all products created by Acme and/or to identify all products in the AcmeX product family manufactured by Acme Co. Each stored plumbing supply product may include their respective part number and/or year of release.

In addition to the product description, the plumbing supply product database may also include a plurality of images corresponding to each stored plumbing supply product. In some embodiments, each plumbing supply product may include images of the particular plumbing supply product captured from a standardized set of camera angles. It should be appreciated the standardized set of camera angles may vary between plumbing supply product categories (i.e., plumbing supply lines may contain a different set of standardized angles than plumbing valves).

In some further embodiments, each plumbing supply product in the plumbing supply product database may be tagged with a set of tags describing the product. As used herein, a "tag" may refer to a determined label representative of a particular aspect and/or feature of a plumbing supply product, and "tagging" may refer to labeling data representative of a plumbing supply product with a tag. For example, a supply line may be tagged with tags indicating that the supply line is made from metal, has a coupling with six prongs, is 6¼" in diameter, and so on. When combined with the manufacturer name and product family information, each item in the plumbing supply database may be tagged with a unique combination of tags.

As used herein, "descriptor" refers to a numerical vector of data that represents an aspect of image data. The descriptor may correlate to a particular feature of image data represented by a tag. For example, a first descriptor may represent the shape of a coupling (e.g., hexagonal, circular, or other shape), and a second descriptor may represent a color of the coupling. Based upon the descriptor values generated by processing a set of image data, a plumbing supply product may be tagged with a respective shape and/or color tag. It should be appreciated that a descriptor may represent a particular plumbing supply product as a whole as well as an individual aspect of a plumbing supply product (e.g., a tag represents the Acme Co. model A123-Z1 plumbing supply line). As used herein, a "descriptor rule" may refer to a mathematical operation performed on a set of image data to generate a corresponding descriptor. As an example, a descriptor rule for a color descriptor may comprise an average of a red, green, and blue respective pixel values within a set or subset of image data. In this example, if a stored set of image data represents a pure red image, after the stored image is processed by the color descriptor rule, a descriptor or vector of [255, 0, 0] may be generated and associated with the stored image. Further, descriptor rules may also include a threshold value that indicates a Euclidean distance from a stored representative descriptor in which a corresponding descriptor generated by processing a set of image data must fall within to be considered a match, and thus tagged with the corresponding tag. As used herein, a "representative descriptor" may refer to a stored descriptor corresponding to a tag in which other generated descriptors are compared to when determining whether a set of image data should be tagged with the corresponding tag.

In some embodiments, the stored representative descriptors, descriptor rules and thresholds may be stored as part of the plumbing supply product database, an identification server, and/or any other computer component capable of storing data. The stored representative descriptors, descriptor rules and thresholds may be determined and/or modified through computer learning and/or training techniques. For example, the identification server may test the predictive power of a plurality of randomly-generated representative descriptors, descriptor rules and thresholds by storing a set of training images that were manually tagged. Subsequently, the system may test whether the known plumbing supply product was correctly identified by the system through the use of the generated representative descriptors. After completing a large number of these tests, the server may identify a set of representative descriptors, descriptor rules and thresholds that has a strong likelihood of correctly identifying the correct plumbing supply product and/or set of tags for a plurality of unidentified plumbing supply products. As more products are added to the plumbing supply products database, the identification server may identify a new set of representative descriptors, descriptor rules and/or thresholds that has even stronger predictive power than the previously stored set of representative descriptors, descriptor rules and thresholds.

It should be appreciated the above examples of generating and/or modifying representative descriptors, descriptor rules and thresholds for tags are not intended to be limiting and other techniques to generate and/or modify representative descriptors, descriptor rules and thresholds may be implemented within the scope of the present invention.

After an insurance provider sets up a plumbing supply product database and the representative descriptor, descriptor rule and threshold information as described above, the insurance provider may leverage the database for more efficient processing of claims. In some cases, the insurance provider may have pre-negotiated subrogation contracts with particular manufacturers of plumbing supply products. The present embodiments enable the insurance provider to quickly identify whether a plumbing supply product associated with an insurance claim is manufactured by a plumbing supply product manufacturer with a pre-negotiated subrogation contracts. In some scenarios, the unidentified plumbing supply product may identified as a product that was manufactured too long ago to qualify for subrogation. The insurance provider may then terminate the subrogation process sooner, saving the insurance provider time and money that is not spent pursuing a subrogation claim with a low likelihood of success. By being able to identify a particular unidentified plumbing supply product without coordinating an expert site visit, insurance claims can be process faster and/or at lower cost. These savings may be passed on to policyholders in the form of cheaper insurance premiums. In addition to identify plumbing supply lines, the techniques described herein may also improve other technological fields such as logistics, centralized water management, quality control, and/or any other similar technological fields.

Additionally, the use of the plumbing supply product database centralizes the processing of the plumbing supply product identification process. To this end, the previous manual identification process relied upon the specialized product database traveling to the site of the unidentified plumbing supply product (via the mind of the product specialist). Conversely, an identification sever interconnected with the plumbing supply database may be specially configured to a computing environment optimized for executing descriptor rules on received images and/or updating a corresponding machine learning algorithm that generates the descriptor rules. To this end, although for ease of explanation the exemplary descriptors and/or descriptor rules described herein may describe simple concepts, in practice, descriptors may be far more complex. For example, a descriptor may represent a multi-dimensional analysis of an image that has no inherent analog to a concept perceivable by humans. Moreover, such calculations may not involve computations that are commonly performed by general purpose computing devices. Thus, in some embodiments, the advanced image recognition techniques described herein may be processed more efficiently through execution by a centralized, specialized computing environment (such as an identification server), where the computer processors are configured and/or optimized to more efficiently execute the particular types of algorithms utilized in multi-dimensional image recognition techniques. As a result, when the identification server executes instructions containing the image recognition techniques described the instructions may be process more efficiently by the identification server than when the same instructions are executed by a general-purpose electronic device (e.g., mobile phone, tablet, etc.).

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

I. Exemplary Identification Environment

FIG. 1 illustrates an example environment 100 associated with identifying an unidentified plumbing supply product. Although FIG. 1 depicts certain entities, components, and devices, it should be appreciated that additional or alternate entities and components are envisioned.

As illustrated in FIG. 1, the environment 100 may include an unidentified plumbing supply product 105 that may be associated with an insurance claim. The unidentified plumbing supply product 105 may be a plumbing supply line, a valve, a coupling, a faucet, a fitting, and/or any other plumbing supply component. The environment 100 may also include an electronic device 110. Although the electronic device 110 is depicted as a smartphone, the electronic device may be any electronic device, such as a desktop computer, a laptop, a tablet, a phablet, a smart watch, smart glasses, wearable electronics, pager, personal digital assistant, and/or any other electronic device, including computing devices configured for wireless radio frequency (RF) communication. In some embodiments the electronic device may be associated with an individual, such as a policyholder or a claims adjustor that lacks the expertise to identify the unidentified plumbing supply product 105.

The electronic device 110 may store machine-readable code representative of a plumbing supply identification application ("application") 115 stored in a memory therein. As part of the process to identify the unidentified plumbing supply product 105, the individual may launch and/or execute the application 115. As a result, the electronic device 110 may display an interface that may direct the individual through the process of identifying the unidentified plumbing supply product 105. The application 115 may further cause the electronic device 110 to present an interface for capturing image data of the unidentified plumbing supply product 105. In some embodiments, the application 115 may also cause the electronic device 110 to display on the interface an instruction directing the individual to capture a particular feature and/or angle of the unidentified plumbing supply product 105. According to certain aspects, the interface may instruction the individual to capture image data depicting multiple features and/or angles of the unidentified plumbing supply product 105.

According to present embodiments, the application 115 may cause the electronic device 110 to transmit the captured image data to an identification server 125 via a network 120. The network 120 may facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, WiFi, Bluetooth, and others). In some further embodiments, in addition to the captured image data, the application 115 may cause the electronic device 110 to transmit indications of manual user input (e.g., a claim number, a category of plumbing supply product, a material, and/or others).

According to embodiments, the identification server 125 may be coupled to a plumbing supply product database 135 that may store data representative of a plurality of known plumbing supply products and/or tags their respective representative descriptors, descriptor rules, and/or threshold values as determined using techniques described elsewhere herein. Although FIG. 1 depicts the plumbing supply product database 135 as coupled to the identification server 125, it is envisioned that the plumbing supply product database 135 may be maintained in the "cloud" such that any element of the environment 100 capable of communicating over the network 120 may directly interact with the plumbing supply product database 135. In some embodiments, the plumbing supply product database 135 may be stored in a memory component of the identification server 125.

The identification server 125 may analyze the received image data, as well as any indications of manual user input, to identify the unidentified plumbing supply product 105. Based upon the received image data and/or manual user input, the identification server 125 may generate a set of descriptors that describe the unidentified plumbing supply product 105. The generated set of descriptors may be compared to respective representative descriptors for plumbing supply products and/or tags stored in the plumbing supply product database 135. If a generated descriptor is similar enough to a particular stored descriptor (e.g., within a threshold distance of a representative descriptor), then the unidentified plumbing supply product 105 may be considered a match of the stored plumbing supply product and/or tags. When the image data representative of the unidentified plumbing supply product 105 matches a tag corresponding to a particular stored plumbing supply product, the identification server 125 may identify the unidentified plumbing supply product 105 as the particular stored plumbing supply product. Further, when the set of tags matching the image data representative of the unidentified plumbing supply product 105 matches a set of tags corresponding to a particular stored plumbing supply product in the plumbing supply product database 135, then the identification server 125 may identify the unidentified plumbing supply product 105 as that particular stored plumbing supply product.

The identification server 125 may then transmit an indication that the unidentified plumbing supply product 105 was successfully identified. The indication may identify the unidentified plumbing supply product as the particular stored plumbing supply product. When the application 115 determines that the electronic device 110 has received the indication of success, the application 115 may cause the electronic device 110 to display a visual indication to the individual that unidentified plumbing supply product 105 was successfully identified. In other embodiments, prior to displaying the indication of success, the application 115 may cause the electronic device 110 to display a list known plumbing supply products, including the particular stored plumbing supply product. The list may include images and/or a textual description of each plumbing supply product in the list. In these embodiments, the user of the electronic device 110 may select the listed plumbing device that the user believes matches the unidentified plumbing supply product 105. According to certain aspects, the identification server 125 may also include the identity of the particular stored plumbing supply product within the insurance claim associated with the unidentified plumbing supply product 105.

In some embodiments, if the identification server 125 determines there is no matching plumbing supply product and/or set of tags, the identification server 125 may generate a request to receive another set of image data. If the identification server 125 determined there was a deficiency in the first set of image data (e.g., the image was blurry, out of focus, too dark, etc.) the request may include an instruction to correct the deficiency. If the identification server 125 determined that image data for a different feature and/or angle of the unidentified plumbing supply product 105 is needed to identify the unidentified plumbing supply product 105, the request may include an instruction to direct the individual to capture the needed feature and/or angle of the unidentified plumbing supply product 105. In response to the application 115 determining that the electronic device 110 has received the request for more image data, the application 115 may cause the electronic device 110 to display an interface for capturing the additional image data.

II. Exemplary Identification of a Plumbing Supply Product

Figure 2:
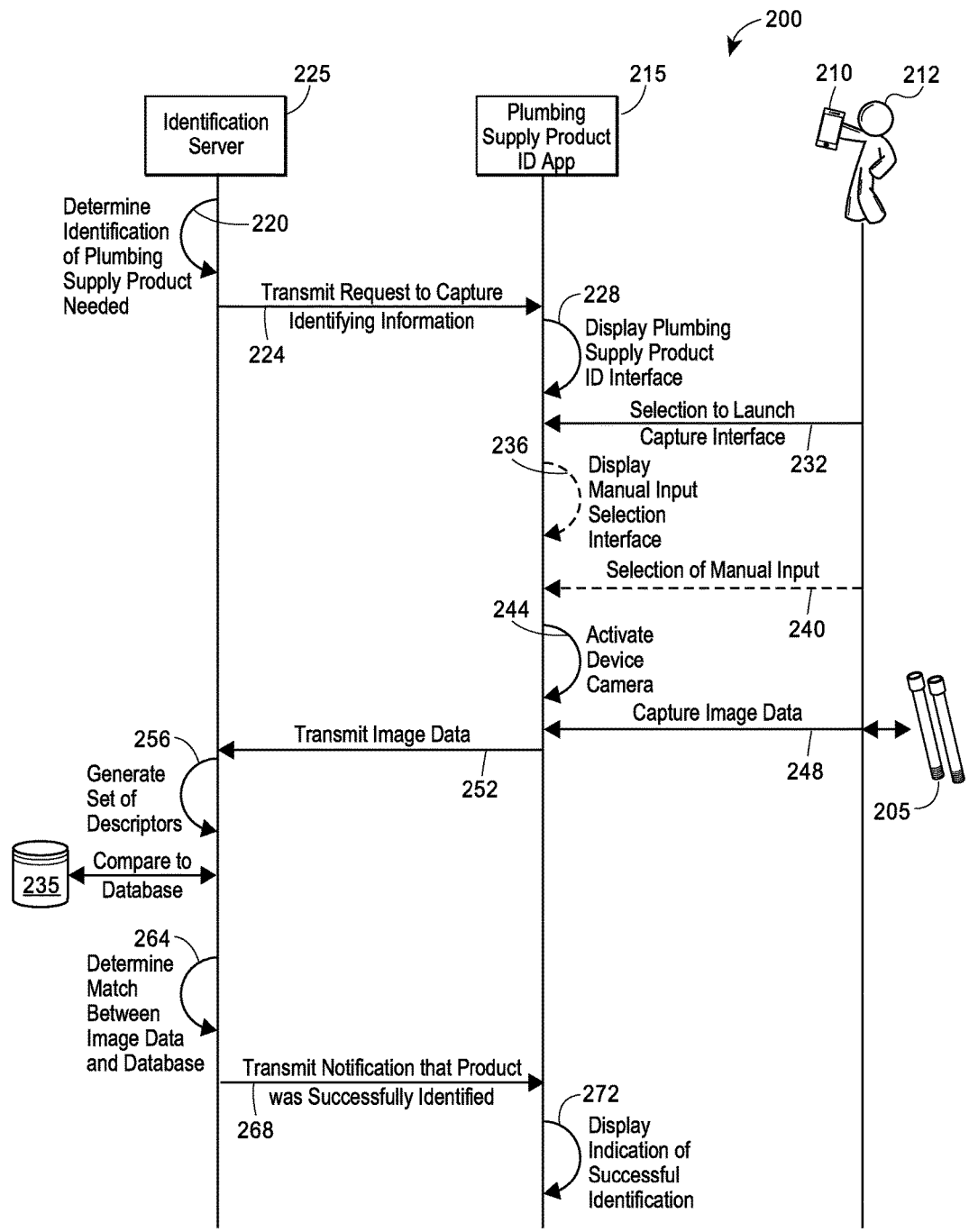
FIG. 2 depicts an example signal diagram associated with the depicted components of FIG. 1, for identifying an unidentified plumbing supply product, in accordance with some embodiments.

Referring to FIG. 2, illustrated is a signal diagram 200 associated with identifying an unidentified plumbing supply product. In particular, FIG. 2 includes an identification server 225 (such as the identification server 125 as described with respect to FIG. 1), a plumbing supply product identification application ("application") 215 (such as the plumbing supply product identification application 115 as described with respect to FIG. 1), an individual 212 associated with an electronic device 210 (such as the electronic device 110 as described with respect to FIG. 1), an unidentified plumbing supply product 205 (such as the unidentified plumbing supply product 105 as described with respect to FIG. 1), and a plumbing supply product database 235 (such as the plumbing supply product database 135 as described with respect to FIG. 1). It should be appreciated that the electronic device 210 may comprise any type of electronic device. Although only the electronic device 210 and the unidentified plumbing supply product 205 are depicted in FIG. 2, it should be appreciated that the identification server 225 may communicate with a plurality of electronic devices to identify a plurality of unidentified plumbing supply products.

The signal diagram 200 may begin when the identification server 225 determines (220) that an identification of the unidentified plumbing supply product 225 is needed, for example, to subrogate and/or process an insurance claim. To this end, the identification server 225 may scan an archive of insurance claim data (not depicted) for an insurance claim involving the unidentified plumbing supply product 205. When the identification server 225 identifies an insurance claim involving the unidentified plumbing supply product 205, the identification server may scan the insurance claim data to identify the electronic device 210 and/or the individual 212. The identification server 225 may then transmit (224) a request to the electronic device 210 to capture identifying information corresponding to the unidentified plumbing supply product 205.

In some embodiments, the electronic device 210 may have the application 215 loaded in a memory. The application 215 may operate as a background process that monitors a communication module of the electronic device 210 to detect that the electronic device 210 has received the request to capture identifying information. Upon detecting that that the electronic device 210 has received the request to capture identifying information, the application 215 may cause the electronic device 210 to display an alert to the individual 212. In some embodiments, when the individual 212 interacts with the alert, the application 215 may cause the electronic device 210 to display (228) a plumbing supply product identification interface. It should be appreciated that the application 215 may also cause the electronic device 210 to display the plumbing supply product identification interface automatically upon receiving the request to capture identifying information and/or in response to the individual manually launching the application 215 without first receiving the request to capture identifying information.

The individual 212 may interact with the plumbing supply product identification interface to select an interface element indicating that the individual 212 may be ready to capture the identifying information. In some embodiments, the interaction may be touching a soft key and/or an icon, performing a gesture (e.g., swiping), providing a verbal command, and/or any other technique for receiving input from the individual 212. Regardless of the method of interaction, the application 215 may detect the selection (232) provided by the individual 212 to launch an image capture interface.

In some optional embodiments, in response to detecting the selection to launch the image capture interface, the application 215 may first cause the electronic device 210 to display (236) an interface to receive manual input from the individual 212. The manual input interface may present a question and/or a series of questions to the individual 212. For example, the manual input interface may ask the individual 212 to input a category of plumbing supply products or a material from which the unidentified plumbing supply product 205 is made. In order to select the manual input, the application 215 may cause the electronic device 210 to present a plurality interface elements, including drop down menus, check boxes, blank text fields or any other method of input via an interface from the individual 212. Regardless of the method of input, the application 215 may detect the selection (240) of manual input provided by the individual 212.

In some further optional embodiments not depicted in FIG. 2, the application 215 may cause the electronic device 210 to transmit the selection of manual input to the identification server 225. Based upon the manual input, the identification server 225 may determine an instruction to begin to narrow the set of potential known plumbing supply products the unidentified plumbing supply product 205 may be identified as. For example, if the individual 212 selected that the unidentified plumbing supply product 205 is a metal pipe, the identification server 225 may determine that a first set of image data representative of a first feature and/or angle may be more likely to predict the identity of the unidentified plumbing supply product 205 than if the individual 212 had selected that the unidentified plumbing supply product 205 is a PVC pipe. Accordingly, if the individual 212 selected that the unidentified plumbing supply product 205 is a PVC pipe, the identification server 225 may determine that a second set of image data representative of a second feature and/or angle may be more likely to predict the identity of the unidentified plumbing supply product 205. Based upon the determined set of image data, the identification server 225 may generate and/or transmit to the electronic device 210 an instruction to capture the determined set of image data. As an example, if the determined set of image data is one that includes the shape of a coupling, the generated instruction may be to capture image data representative of a frontal angle of the coupling. It should be appreciated that in some embodiments, multiple images may be required to capture the determined set of image data (e.g., the determined set of image data may include an image of each end of a hose).

In any case, the application 215 may cause the electronic device 210 to activate (244) a camera interface (and/or an interface for another type of image sensor). The camera interface may display a preview of image data that the electronic device 210 may capture and/or store. In some embodiments, the camera interface may also display an instruction to the individual 212 requesting that that the individual 212 captures an image of the unidentified plumbing supply product 205 in a particular way. For example, the instruction may include guidelines that assist the user in aligning the electronic device 210 to capture image data representative of the unidentified plumbing supply product 205 from the correct angle. In embodiments where the application 215 has detected that the electronic device 210 received an instruction from the identification server 225, the displayed instruction may be the received instruction. In other embodiments, the application 215 may cause the electronic device 210 to display a default instruction.

The camera interface may also include elements that enable the individual 212 to capture an image of the unidentified plumbing supply product 205. In some embodiments, the camera interface may include a soft button that causes the electronic device 210 to capture and/or store displayed image data. In other embodiments, the application 215 may recognize elements of the displayed image data and cause the electronic device 210 to automatically capture and/or store the displayed image data. In any case, the application 215 may detect a trigger to capture and/or store the displayed image data causing the electronic device 210 to capture (248) and/or store the displayed image data. In embodiments in which the determined set of image data requires multiple images, the application 215 may interact with the camera of the electronic device 210 to facilitate the capture and/or storage of the additional images. The application 215 may then cause the electronic device 210 to transmit (252) the captured image data to the identification server 215.

According to present embodiments, after receiving the captured image data, the identification server 225 may analyze the captured image data to generate (256) a set of descriptors representative of a plurality of aspects of the captured image data. As described elsewhere herein, the identification server 225 may store and/or have communicative access to a plurality of data representative of a plurality of known plumbing supply products, including a plurality of tags and their respective representative descriptors, descriptor rules, and thresholds, as described elsewhere herein. By processing the captured image data via the plurality of descriptor rules corresponding to respective descriptors, the identification server 225 may generate a plurality of corresponding descriptors representative of the unidentified plumbing supply product 205. The identification server 225 may compare the plurality of generated descriptors to the plurality of respective representative descriptors to determine whether the Euclidean distance between the generated and respective representative descriptors is within the respective threshold value. When the Euclidean distance is within the respective threshold value, the unidentified plumbing supply product 205 may be tagged with the respective tag. As an example, if the identification server 225 processes the captured image data using a "six-prongs" descriptor rule, and the generated descriptor is within the "six prongs" threshold Euclidean distance from the "six prongs" representative descriptor, the unidentified plumbing supply product 205 may be tagged with the "six prongs" tag.

The identification server 225 may determine whether to tag the unidentified plumbing supply product 205 with each of a plurality of tags associated with known possible plumbing supply products for which the unidentified plumbing supply product 205 may still be identified as. In one example, when the identification server 225 has received manual input indicating that the unidentified plumbing supply product 205 is a metal valve, the set of tags for associated with all stored metal valves may be smaller than the overall set of tags associated with all known plumbing supply products. In this example, the identification server 225 may only generate descriptors corresponding to the subset of tags associated with stored metal valves. It should be appreciated that as the identification server 225 determines whether or not the unidentified plumbing supply product 205 should be tagged with each tag, the set of tags associated with known possible plumbing supply products for which the unidentified plumbing supply product 205 may still be identified as may decrease. Thus, even though there may initially be 500 tags associated with all metal valves, the identification server 225 may only generate 25 descriptors for image data representative of a metal valve.

In some embodiments, each tag may also be associated with a priority value. The priority may be representative of the number of tags that can be eliminated from the set of possible tags if the unidentified plumbing supply product 205 is tagged with the corresponding tag. In order to save processing time, the identification server 225 may generate descriptors beginning with the highest priority tag and proceed until generating the descriptor corresponding to the possible tag with the lowest priority. In some embodiments, the identification server 225 may execute computer training and/or learning algorithms to optimize the priority values based upon the operation of the identification process in an implementation.

By reducing the number of descriptors generated to the most determinative descriptors, the amount of processing power required to determine whether the unidentified plumbing supply product 205 matches a known plumbing supply product can be minimized. This reduces the amount of clock cycles dedicated to an image analysis routine and further enables the identification server 225 to reduce the amount of processing resources allocated to identifying any individual unidentified plumbing supply product from the plurality of unidentified plumbing supply products, including the unidentified plumbing supply product 205.

When the identification server 225 completes the process of determining whether to tag the unidentified plumbing supply product 205 with each tag associated with the plumbing supply products for which the unidentified plumbing supply product 205 may still be identified as, the identification server 225 may have generated a set of tags corresponding to the unidentified plumbing supply product 205. The identification server may then compare (260) the set of tags to a respective set of tags corresponding to each known plumbing supply product for which the unidentified plumbing supply product 205 may still be identified. The identification server 215 may determine (264) that the generated set of tags is matches and/or is identical to a set of tags for a particular plumbing supply product in the plumbing supply product database 235. Accordingly, the identification server 215 may identify the unidentified plumbing supply product 205 as the particular plumbing supply product from the plumbing supply product database 235.

Similarly, in some scenarios, a tag in the generated set of tags corresponding to the unidentified plumbing supply product 205 may represent a particular plumbing supply product stored in the plumbing supply product database 235. In these scenarios, the unidentified plumbing supply product 205 may be identified as the particular plumbing supply product represented by the tag. In these scenarios, the identification server 225 may still compare the generated set of tags to the set of tags associated with the particular plumbing supply product's set of tag to ensure compatibility and provide further confidence in the determined identity.

Additionally or alternatively, as part of the matching and/or identification process, the identification server 225 may generate a list of the closest matching plumbing supply products in the plumbing supply product database 235. For example, the closeness of the match may be determined by the number of tags in common between the stored plumbing supply product and the unidentified plumbing supply product 205. As another example, closeness may be determined by the closeness between the received image data and the descriptor corresponding to a particular plumbing supply product in the plumbing supply product database 235. In scenarios in which the unidentified plumbing supply product 205 is identified as the particular plumbing supply product from the plumbing supply product database 235, the identification server may ensure that the particular plumbing supply product is included within the list of matching plumbing supply products.

After determining that the unidentified plumbing supply product 205 matches the particular plumbing supply product and/or generating a list of matching plumbing supply products, the identification server 225 may transmit (268) to the electronic device 210 a notification that the unidentified plumbing supply product 205 was successfully identified. In some embodiments, the notification may also identify the unidentified plumbing supply product 205 as the particular plumbing supply product from the product supply product database 235. In other embodiments, the notification may include the list of matching plumbing supply products. The application 215 may detect that the electronic device 210 has received the notification of successful identification and/or cause the electronic device 210 to display (272) an indication that the unidentified plumbing supply product 205 was successfully identified and/or the list of matching plumbing supply products. In embodiments in which the notification includes the list of matching plumbing supply products, the individual 212 may select a listed plumbing supply product that the individual believes matches the unidentified plumbing supply product 205. In response, the application 215 may identify the unidentified plumbing supply product 205 as the selected plumbing supply product. In some embodiments, the application 215 may further cause the electronic device 210 to display the determined identity of the unidentified plumbing supply product 205, as well as any other useful information relating to the determined identity of the unidentified plumbing supply product (e.g., a replacement cost, a reliability rating, online review data, and so on). The signal diagram 200 may include additional, fewer, or alternate actions, including those discussed elsewhere herein.

III. Exemplary User Interfaces

An electronic device (such as the electronic device 110 as described with respect to FIG. 1) may provide several interfaces that enable an individual to identify an unidentified plumbing supply product (such as unidentified plumbing supply product 105 as described with respect to FIG. 1). The interfaces may be provided as part of a plumbing supply product identification application (such as the plumbing supply identification application 115 as described with respect to FIG. 1) that is executed on the electronic device.

Figure 3A:
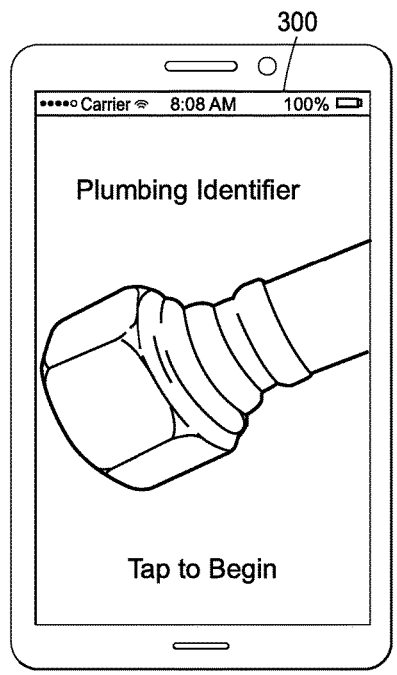
FIG. 3A depicts an exemplary interface displayable by an electronic device, such as the electronic device of FIG. 1, for launching a plumbing supply product identification application in accordance with some embodiments.

FIG. 3A illustrates an exemplary interface 300 that may be displayed by the electronic device upon launching the application. The interface 300 may display an indication that the individual has launched the application ("Plumbing Identifier"). As discussed elsewhere herein, the interface 300 may also provide means to begin the identification process, such as the ability to detect the individual tapping a screen of the electronic device (indicated by the instruction to "Tap to Begin"). It should be appreciated that interface 300 may provide additional, fewer, or alternative interface elements to receive an indication from the individual to begin the identification process.

Figure 3B:
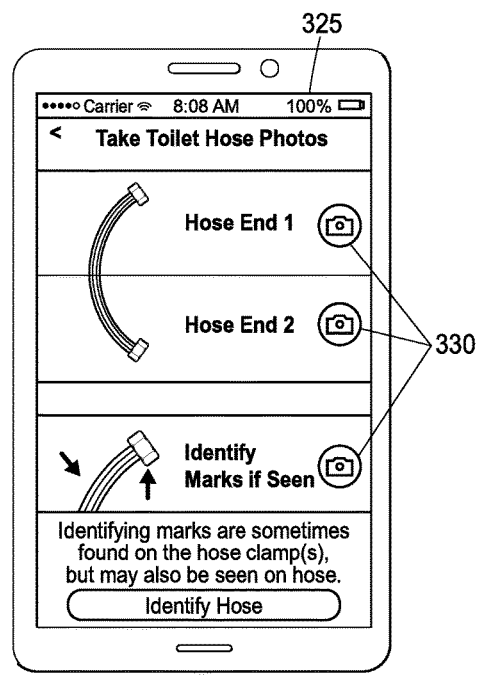
FIG. 3B depicts an exemplary interface displayable by an electronic device, such as the electronic device of FIG. 1, for displaying identification instructions, in accordance with some embodiments.

FIG. 3B illustrates an exemplary interface 325 for displaying identification instructions to the individual. The interface 325 may be presented subsequent to beginning the identification process (such as by selecting the "Begin" soft button illustrated in FIG. 3A). The interface 325 may present to the user a request to receive information about the unidentified plumbing supply product ("Take Toilet Hose Photos"). To this end, the interface 325 may include an instruction to capture image data of the unidentified plumbing supply product from one or more particular angles. For example, as depicted in FIG. 3B, the interface 325 may indicate that the individual should capture an image of each end of a hose, as well as any identifying marks (if seen). Interface 325 may also provide soft buttons 330 that enables the individual to capture a respective set of image data. In some embodiments, after the individual selects the one of the soft buttons 330, the interface 325 may present another interface that enables the individual to capture the respective set image data. Additionally, the interface 325 may include a soft button ("Identify Hose") that enables the individual to indicate that the requested image data has been captured. In response to the selection of this soft button, the application may interact with a remote server to attempt to identify the unidentified plumbing supply product. It should be appreciated that interface 325 may provide additional, fewer, or alternative interface elements to display instructions to the individual to capture information about the unidentified plumbing supply product.

Figure 3C:
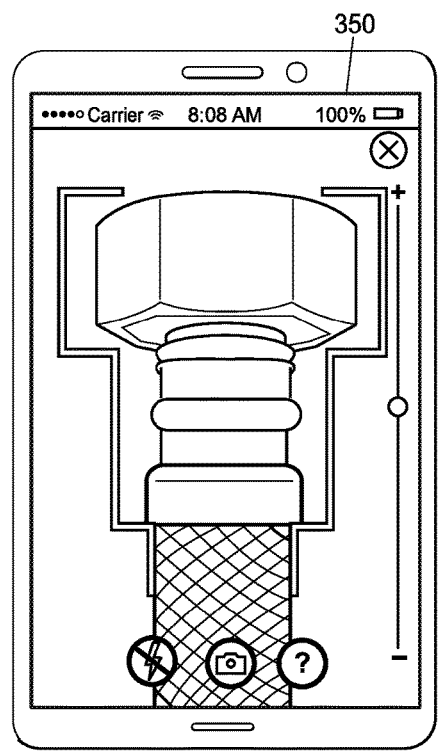
FIG. 3C depicts an exemplary interface displayable by an electronic device, such as the electronic device of FIG. 1, for capturing an image of an unidentified plumbing supply product, in accordance with some embodiments.

FIG. 3C illustrates an exemplary interface 350 for capturing image data representative of the unidentified plumbing supply product. The interface 350 may be presented in response to selecting one of the soft buttons 330, as illustrated in FIG. 3B. The interface 350 may display an instruction and/or guidelines that direct the individual to capture a particular set of image data. For example, as depicted in FIG. 3C, the interface 350 may depict markings that roughly mirror the expected shape of the unidentified plumbing supply product to help ensure that the captured image data is in a format that can be readily analyzed by an identification server. The interface 350 may also provide a "Capture" soft key that causes the electronic device to capture and/or store a set of image data. The interface 350 may further depict a preview of the image data that may be captured and/or stored by the electronic device in response to the individual pressing the "Capture" soft key. It should be appreciated that interface 350 may provide additional, fewer, or alternative interface elements to capture image data representative of the unidentified plumbing supply product.

Figure 3D:
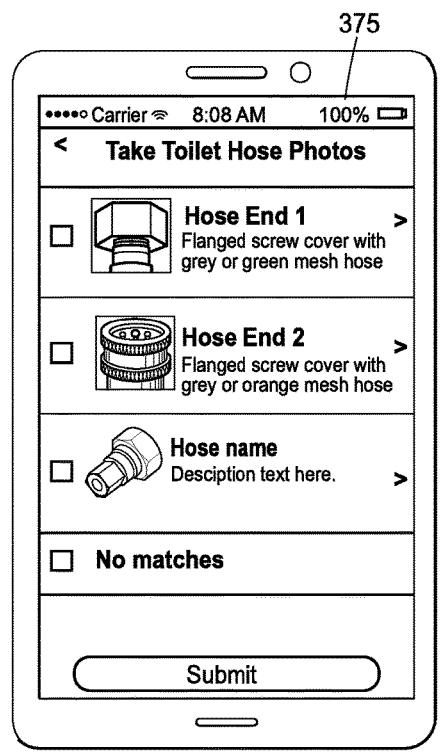
FIG. 3D depicts an exemplary interface displayable by an electronic device, such as the electronic device of FIG. 1, for selecting a matching plumbing supply product, in accordance with some embodiments.

FIG. 3D illustrates an exemplary interface 375 for selecting a matching plumbing supply product. The interface 375 may be presented in response to an identification server analyzing a set of image data transmitted by the electronic device, such as the transmission that may occur when the individual selects the "Identify Hose" soft button, as illustrated in FIG. 3B. The interface 375 may display a selectable list of known plumbing supply products that are most likely be the unidentified plumbing supply product. The list of known plumbing supply products may include an image of the plumbing supply product, as well as a textual description of the known plumbing supply product. The interface 375 may further include a soft button ("Submit") that, when selected, causes the electronic device to transmit an indication of the selected known plumbing supply product. It should be appreciated that interface 350 may provide additional, fewer, or alternative interface elements to select a matching plumbing supply product.

IV. Exemplary Method of Capturing Image Data

Figure 4:
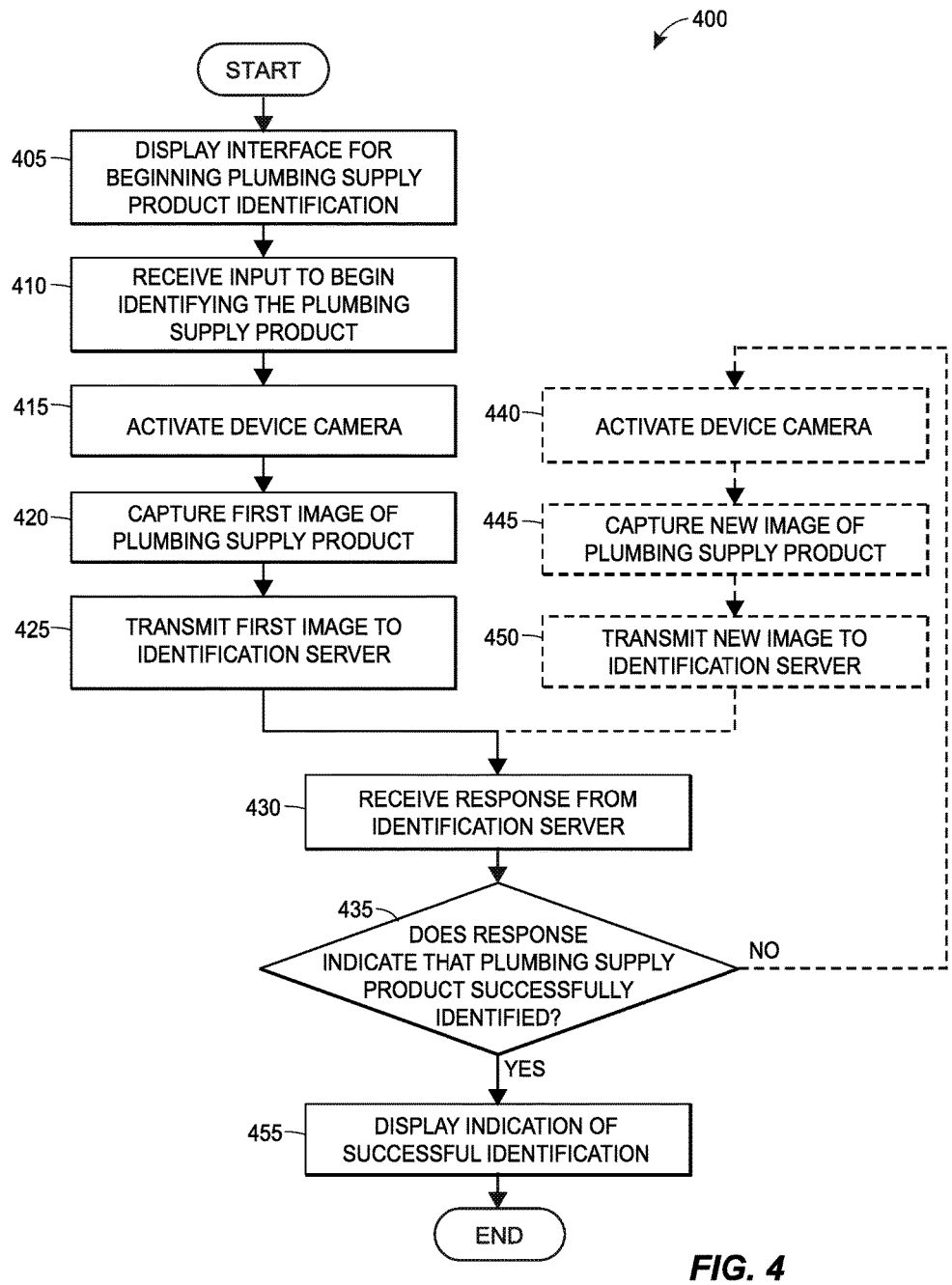
FIG. 4 depicts a flow diagram associated with an electronic device, such as the electronic device of FIG. 1, for identifying for an unidentified plumbing supply product, in accordance with some embodiments.

Referring to FIG. 4, illustrated is a block diagram of an exemplary method 400 for capturing image data to identify an unidentified plumbing supply product. The method 400 may be facilitated by an application (such as the plumbing supply identification application 115 as described with respect to FIG. 1) running on an electronic device (such as the electronic device 110 as described with respect to FIG. 1).

The application may cause the electronic device to display an interface for beginning the plumbing supply product identification process (Block 405), for example, the interface 300 depicted in FIG. 3A. From the beginning interface, a user may interact with the application to indicate that the user is ready to begin identifying the unidentified plumbing supply product. The application may detect and/or receive input corresponding to this user interaction (Block 410). In response, the application may activate the device camera (Block 415) and/or cause the electronic device to present a corresponding interface, for example, the interface 350 depicted in FIG. 3C. The application may then detect and/or receive input from the user to capture a first image of the unidentified plumbing supply product (Block 420) and/or to automatically, or in response to user approval, transmit the first image to an identification server (Block 425).

After transmitting the first image to the identification server, the application may detect that the electronic device has received a response from the identification server (Block 430). The application may determine whether the response indicates that the unidentified plumbing supply product was successfully identified (Block 435). If the response indicates that the unidentified plumbing supply product was not successfully identified ("NO"), the application may further analyze the response to determine an instruction describing a new requested image. After determining the instruction, the application may again activate the device camera (Block 440) and/or cause the electronic device to present the corresponding interface. According to some embodiments, the camera interface may now display an instruction directing the user how to capture the new requested image of the unidentified plumbing supply product. The application may then detect and/or receive input from the user to capture the new image of the unidentified plumbing supply product (Block 445) and/or to automatically, or in response to user approval, transmit the new image to the identification server (Block 450).

After transmitting the new image to the identification server, the application may detect that the electronic device has received another response from the identification server (Block 430). The application may then determine whether the new response indicates that the unidentified plumbing supply product was successfully identified (Block 435). In some embodiments, the successful response may include a list of the closest matching plumbing supply products within a database. If the response indicates that the unidentified plumbing supply product was still not successfully identified ("NO"), the application may perform the actions associated with Blocks 440-450 again. Conversely, if the response indicates that the unidentified plumbing supply product was successfully identified ("YES"), the application may display an indication that the identification occurred successfully (Block 455). In embodiments in which the electronic device received the list of the closest matching plumbing supply products, the application may cause the device to display the received list. In these embodiments, the display of successful identification may not occur until after the user selects a displayed plumbing supply product from the list of closest matching plumbing supply products. It should be appreciated that the method 400 may include additional, fewer, or alternate actions, including those discussed elsewhere herein.

V. Exemplary Method for Analyzing Image Data

Figure 5:
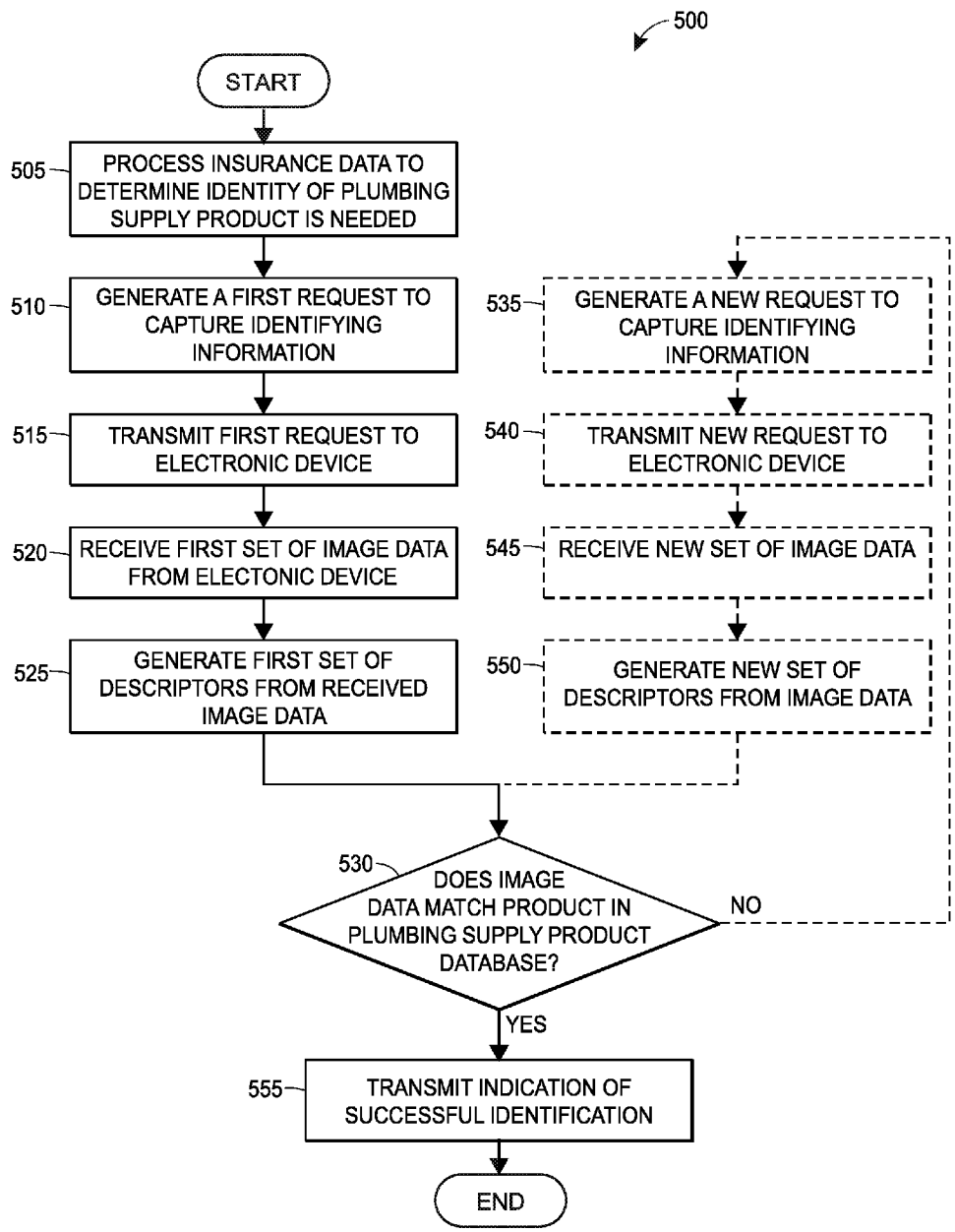
FIG. 5 depicts a flow diagram associated with an identification server, such as the identification server of FIG. 1, for identifying for an unidentified plumbing supply product, in accordance with some embodiments.

Referring to FIG. 5, illustrated is a block diagram of an exemplary method 500 for analyzing image data to identify an unidentified plumbing supply product. The method 500 may be facilitated by an identification server (such as the identification server 125 as described with respect to FIG. 1) communicatively coupled to a plumbing supply product database (such as the identification server 125 as described with respect to FIG. 1).

The identification server may process insurance data to determine that an identity of an unidentified plumbing supply product is needed to process and/or subrogate an insurance claim (Block 505). The identification server may then generate a request to capture identifying information of the unidentified plumbing supply product (Block 510) and transmit the request to an electronic device associated with the insurance claim (Block 515). In some embodiments, identifying information may be captured in one or more images. In response, the identification server may receive a first set of image data from the electronic device (Block 520).

According to present embodiments, the identification server may then generate a first set of descriptors that represent a plurality of aspects of the first set of image data (Block 525). The identification server may then use the first set of descriptors to a determine set of tags that apply to the first set of image data. The identification server may associate any tags that apply to the first set of image data with the unidentified plumbing supply product. The identification server may further determine whether the set of tags associated with the unidentified plumbing supply product matches a set of tags associated with a known plumbing supply product in the plumbing supply product database (Block 530).

If the set of tags associated with the unidentified plumbing supply product does not match a known plumbing supply product in the plumbing supply product database ("NO"), the identification server may generate a request to capture new identifying information (Block 535). In order to generate the request for new information, the identification server may first determine a list plumbing supply products in the plumbing supply product database that may still potentially match the unidentified plumbing supply product. The identification server may analyze this list determine an instruction to include in the generated request. As an example, the list of possible matches in the plumbing supply product database may be two different hoses, one with a copper link between the hose and its coupling, and one with an aluminum-alloy link. In this example, the instruction may be to capture an image of the link between the hose and coupling. Of course, the instruction may vary depending on the list of possible matches in the plumbing supply product database. For example, the instruction may also direct the individual to capture at least one of text or symbols on the unidentified plumbing supply product, a side-view of the unidentified plumbing supply product, a front-view of the unidentified plumbing supply product, an image of a coupling associated with the unidentified plumbing supply product, and a physical token indicative of the scale of the unidentified plumbing supply product.

By generating an instruction based on the list of potential matches in the plumbing supply product database, the amount of times new sets of image data will be requested, transmitted, and/or analyzed may be minimized. This enables the disclosed systems and methods to reduce the number of network communication resources dedicated to the transmission and/or reception of image data and/or requests to capture image data. In turn, a communication module associated with the identification server and/or the electronic device may require less processing power, reducing the overall processor load corresponding to the identification server and/or electronic device, respectively.

The identification server may then transmit to the electronic device the request to capture new identifying including the generated instruction (Block 540). In response, the identification server may receive from the electronic device a new set of image data (Block 545). The identification server may then generate a new set of descriptors based upon the new set of image data (Block 550). The identification server may further associate the unidentified plumbing supply product with any new tags that apply to the new set of image data.

The identification server may then determine whether the updated set of tags associated with the unidentified plumbing supply product matches a set of tags associated with a known plumbing supply product in the plumbing supply product database (Block 530). If the updated set of tags associated with the unidentified plumbing supply product still does not match a known plumbing supply product in the plumbing supply product database ("NO"), the identification server may perform the actions associated with Blocks 535-550 again. Conversely, if the updated set of tags associated with the unidentified plumbing supply product now does match a known plumbing supply product in the plumbing supply product database ("YES"), the identification server may transmit an indication that the unidentified plumbing supply product has been successfully identified (Block 555). In some embodiments, the transmitted indication includes a determined identity of the unidentified plumbing supply product. Additionally or alternatively, the transmitted indication may include a list of the closest matching plumbing supply products in the plumbing supply product database that includes the matching plumbing supply product. It should be appreciated that the method 500 may include additional, fewer, or alternate actions, including those discussed elsewhere herein.

VI. Exemplary Electronic Device

Figure 6:
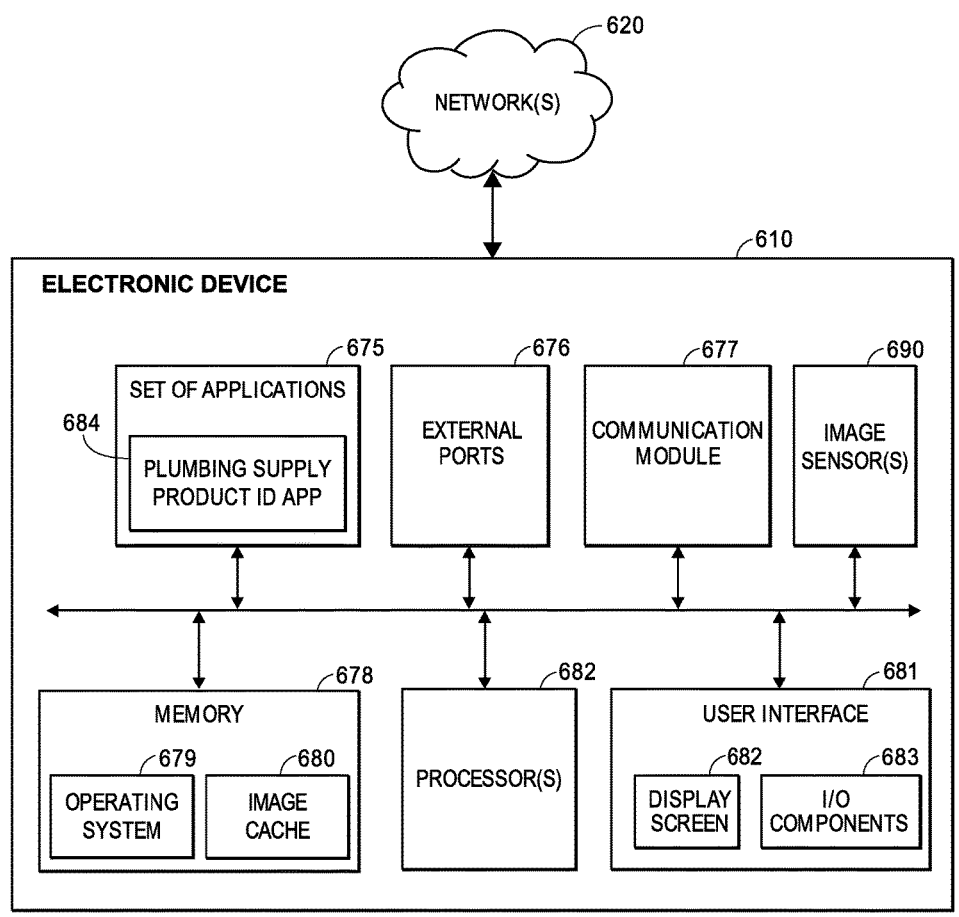
FIG. 6 is a block diagram of an exemplary electronic device, such as the electronic device of FIG. 1, in accordance with some embodiments.

FIG. 6 illustrates a diagram of an exemplary electronic device 610 (such as the electronic device 110 as discussed with respect to FIG. 1) in which the functionalities as discussed herein may be implemented. It should be appreciated that the electronic device 610 may be associated with an individual, as discussed herein.

The electronic device 610 may include one or more processors 622 as well as a memory 678. The memory 678 may store an operating system 679 capable of facilitating the functionalities as described herein. The memory 678 may further store an image cache 680 for storing image data captured by one or more image sensors 690. The electronic device 610 may also store a set of applications 675 (i.e., machine readable instructions). For example, one of the set of applications 675 may be a plumbing supply product identification application 684 configured to direct the individual through the process of identifying an unidentified plumbing supply product. It should be appreciated that other applications are envisioned.

The one or more processors 622 may interface with the memory 678 to execute the operating system 679 and the set of applications 675. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 610 may further include a communication module 677 configured to communicate data via one or more networks 620. According to some embodiments, the communication module 677 can include one or more transceivers (e.g., WWAN, WLAN, and/or WPAN transceivers) functioning in accordance with IEEE standards, 3GPP standards, or other standards, and configured to receive and transmit data via one or more external ports 676. For example, the communication module 677 may send, via the network 620, image data representative of an unidentified plumbing supply product captured by the image one or more sensors 690. The electronic device 610 may further include a user interface 681 configured to present information to the individual and/or receive inputs from the individual. As shown in FIG. 6, the user interface 681 may include a display screen 682 and/or I/O components 683 (e.g., ports, capacitive or resistive touch sensitive input panels, keys, buttons, lights, LEDs, speakers, microphones). According to the present embodiments, the user may access the electronic device 610 via the user interface 681 to capture image data of the unidentified plumbing supply product and/or perform other functions. In some embodiments, the electronic device 610 may perform the functionalities as discussed herein as part of a "cloud" network or can otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the one or more processors 622 (e.g., working in connection with the operating system 679) to facilitate the functions as described herein. In this regard, the program code may be implemented in any desired language, and may be implemented as machine code, assembly code, byte code, interpretable source code or the like (e.g., via Python, or other languages, such as C, C++, Java, Actionscript, Objective-C, Javascript, CSS, XML). In some embodiments, the computer program product may be part of a cloud network of resources.

VII. Exemplary Identification Server

Figure 7:
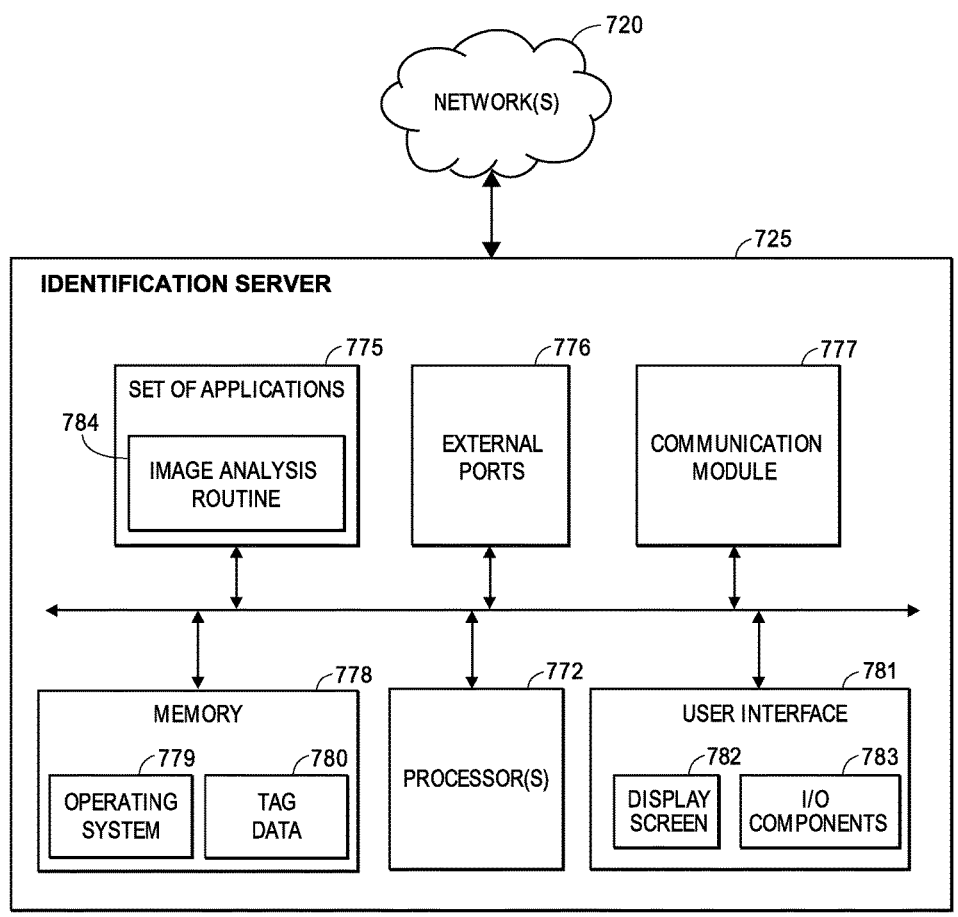
FIG. 7 is a block diagram of an exemplary identification server, such as the identification server of FIG. 1, in accordance with some embodiments.

FIG. 7 illustrates a diagram of an exemplary identification server 725 (such as the identification server 125 as discussed with respect to FIG. 1) in which the functionalities as discussed herein may be implemented. It should be appreciated that the identification server 725 may be associated with an insurance provider, as discussed herein.

The identification server 725 may include one or more processors 722 as well as a memory 778. The memory 778 may store an operating system 779 capable of facilitating the functionalities as described herein. The memory 778 may further store tag data 780 representative of a plurality representative descriptors, descriptor rules, and thresholds as described elsewhere herein. The identification server 725 may also store a set of applications 775 (i.e., machine readable instructions). For example, one of the set of applications 775 may be an image analysis routine 784 configured to generate a plurality of descriptors from a set of received image data. It should be appreciated that other applications are envisioned.

The one or more processors 722 may interface with the memory 778 to execute the operating system 779 and the set of applications 775. The memory 778 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The identification server 725 may further include a communication module 777 configured to communicate data via one or more networks 720. According to some embodiments, the communication module 777 can include one or more transceivers (e.g., WWAN, WLAN, and/or WPAN transceivers) functioning in accordance with IEEE standards, 3GPP standards, or other standards, and configured to receive and transmit data via one or more external ports 776. For example, the communication module 777 may receive, via the network 720, image data representative of an unidentified plumbing supply product. The identification server 725 may further include a user interface 781 configured to present information to the individual and/or receive inputs from the individual. As shown in FIG. 7, the user interface 781 may include a display screen 782 and/or I/O components 783 (e.g., ports, capacitive or resistive touch sensitive input panels, keys, buttons, lights, LEDs, speakers, microphones). According to the present embodiments, the user may access the identification server 725 via the user interface 781 to update the operating system 779 and/or perform other functions. In some embodiments, the identification server 725 may perform the functionalities as discussed herein as part of a "cloud" network or can otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the one or more processors 722 (e.g., working in connection with the operating system 779) to facilitate the functions as described herein. In this regard, the program code may be implemented in any desired language, and may be implemented as machine code, assembly code, byte code, interpretable source code or the like (e.g., via Python, or other languages, such as C, C++, Java, Actionscript, Objective-C, Javascript, CSS, XML). In some embodiments, the computer program product may be part of a cloud network of resources.

VIII. Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The term "insurance policy," as used herein, generally refers to a contract between an insurer and an insured. In exchange for payments from the insured, the insurer pays for damages to the insured which are caused by covered perils, acts or events as specified by the language of the insurance policy. In some scenarios, when the insurer pays damages to the insured, the insurer may be able recover the cost of those damages from one or more third parties. The term "subrogation," as used herein, generally refers to the process of recovering the cost of damages from these third parties.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary and does not describe every possible embodiment, as describing every possible embodiment would be impractical, if not impossible. One could implement numerous alternate embodiments, using either current technology or technology developed after the filing date of this application.

What is claimed:

1. A computer-implemented method for identifying an unidentified plumbing supply product, the method comprising:
generating, by the one or more processors, a first request to capture identifying information corresponding to the unidentified plumbing supply product;
transmitting, via a communications network to an electronic device corresponding to an individual associated with the unidentified plumbing supply product, the first request to capture the identifying information;
receiving, via the communications network, a first set of image data encoding an image of the unidentified plumbing supply product therein;
analyzing, by the one or more processors, the first set of image data to generate a first set of descriptors representative of the unidentified plumbing supply product, wherein each descriptor is a numerical vector representative of an aspect of a set of image data;
comparing, by the one or more processors, the first set of descriptors to a plurality of stored descriptors;
determining, by the one or more processors, that the first set of descriptors does not match a set of stored descriptors of the plurality of stored descriptors corresponding to a particular plumbing supply product stored in a plumbing supply product database, wherein the plumbing supply product database includes data representative of a plurality of known plumbing supply products;
generating, by the one or more processors, a second request to capture identifying information corresponding to the unidentified plumbing supply product;
transmitting, via the communications network to the electronic device corresponding to the individual, the second request to capture the identifying information;
receiving, via the communications network, a second set of image data encoding an image of the unidentified plumbing supply product therein;
analyzing, by the one or more processors, the second set of image data to generate a second set of descriptors representative of the unidentified plumbing supply product; and
determining, by the one or more processors, that the combination of the first and second sets of descriptors indicates that the unidentified plumbing supply product is the particular plumbing supply product stored in the plumbing supply product database; and
transmitting, via the communication network to the electronic device associated with the individual, a notification that the unidentified plumbing supply product has been successfully identified.

2. The computer-implemented method of claim 1, further comprising:
accessing, by the one or more processors, a plurality of tags, wherein the plurality of tags are representative of a plurality of aspects of the plurality of known plumbing supply products.

3. The computer-implemented method of claim 2, wherein the plurality of aspects of the plurality of known plumbing supply products include of at least one of: a shape, a color, particular text or symbols, a size, a scale, or an identity of an individual plumbing supply product.

4. The computer-implemented method of claim 2, wherein data corresponding to each of the plurality of tags comprises:
a descriptor rule, a representative descriptor, and a threshold value.

5. The computer-implemented method of claim 4, wherein generating the first set of descriptors comprises:
processing, by the one or more processors, the first set of image data by performing a plurality of descriptor rules corresponding to the plurality of tags.

6. The computer-implemented method of claim 4, wherein comparing the first set of descriptors to a plurality of stored descriptors further comprises:
for each generated descriptor corresponding to a respective tag:
comparing, by the one or more processors, the generated descriptor to a representative descriptor corresponding respective tag by calculating a Euclidean distance between the generated descriptor and the representative descriptor;
when the calculated Euclidean distance is less than a threshold value corresponding to the respective tag, determining that the unidentified plumbing supply product should be tagged with the respective tag; and
when the calculated Euclidean distance is greater than the threshold value corresponding to the respective tag, determining that the unidentified plumbing supply product should not be tagged with the respective tag.

7. The computer-implemented method of claim 6, wherein determining whether the first set of descriptors indicates that the unidentified plumbing supply product matches a plumbing supply product stored in the plumbing supply product database comprises at least one of:
identifying that the unidentified plumbing supply product has been tagged with a tag representative of the identity of the particular plumbing supply product; and
identifying that the unidentified plumbing supply product has been tagged with a set of tags that is equivalent to a set of tags corresponding to the particular plumbing supply product stored in the plumbing supply product database.

8. The computer-implemented method of claim 1, wherein generating the second request to capture identifying information corresponding to the unidentified plumbing supply product further comprises:
generating, by the one or more processors, an instruction that the identifying information should include a second feature and/or angle of the unidentified plumbing supply product.

9. The computer-implemented method of claim 1, wherein transmitting the notification that the unidentified plumbing supply product has been successfully identified comprises:
transmitting, via the communications network to the electronic device corresponding to an individual, an indication identifying the unidentified plumbing supply product as the particular plumbing supply product stored in the plumbing supply product database.

10. A method for enabling a user to identify an unidentified plumbing supply product via an application executing on an electronic device, wherein the electronic device includes one or more processors, a memory coupled to the one or more processors and a camera configured to capture images including the unidentified plumbing supply product encoded therein, the method comprising:

the application causing the one or more processors to activate the electronic device's camera for capturing a first image of the unidentified plumbing supply product, wherein the unidentified plumbing supply product is associated with an insurance claim;

the application causing the camera to capture the first image, displayed in the application, of the unidentified plumbing supply product;

the application causing the one or more processors to transmit from the electronic device, over a communications network to an identification server associated with an insurance provider, the first image of the unidentified plumbing supply product;

receiving a notification, at the electronic device over the communications network, indicating that the unidentified plumbing supply product has been successfully identified; and in response to receiving the notification that the unidentified plumbing supply product has been successfully identified, causing the one or more processors to display in the application an indication that the unidentified plumbing supply product has been successfully identified.

11. The method of claim 10, wherein the application causing the one or more processors to activate the electronic device's camera for capturing the first image of the unidentified plumbing supply product further comprises:

the application causing the one or more processors to display an instruction indicating a first feature and/or angle of the unidentified plumbing supply product to include in the first image.

12. The method of claim 10, further comprising:

receiving a notification, at the electronic device over the communications network, indicating that a second image is required to identify the unidentified plumbing supply product;

the application causing the one or more processors to activate the electronic device's camera for capturing the second image of the unidentified plumbing supply product;

the application causing the camera to capture the second image, displayed in the application, of the unidentified plumbing supply product; and the application causing the one or more processors to transmit, from the electronic device over a communications network, to the identification server associated with the insurance provider, the second image of the unidentified plumbing supply product.

13. The method of claim 12, wherein the application causing the one or more processors to activate the electronic device's camera for capturing the second image of the unidentified plumbing supply product further comprises:

the application causing the one or more processors to display an instruction indicating a second feature and/or angle of the unidentified plumbing supply product to include in the second image.

14. The method of claim 11, wherein causing to display the instruction indicating the first feature of the unidentified plumbing supply product includes displaying an instruction to capture an image of at least one of:

text or symbols on the unidentified plumbing supply product, a side-view of the unidentified plumbing supply product, a front-view of the unidentified plumbing supply product, a coupling associated with the unidentified plumbing supply product, or a physical token indicative of the scale of the unidentified plumbing supply product.

15. The method of claim 10, further comprising:

in response to receiving an input indicating a selection of a plumbing supply product identification option:

causing the one or more processors to display an interface in the application executing on the electronic device, the interface enabling the reception of a plurality of manual input from the user; and receiving the plurality of manual input at the one or more processors from the user.

16. The method of claim 15, wherein receiving the plurality of manual input further comprises:

receiving manual input indicative of a category of plumbing supply product.

17. The method of claim 10, wherein displaying an indication that the unidentified plumbing supply product has been successfully identified further comprises:

displaying in the application a determined identity of the unidentified plumbing supply product.

18. A system for enabling a user to identify an unidentified plumbing supply product, the system comprising:

a communication network;

one or more electronic devices, wherein each electronic device comprises one or more processors, a memory coupled to the one or more processors and a camera configured to capture images including the unidentified plumbing supply product encoded therein;

one or more servers communicative coupled to the communication network and the one or more electronic devices;

one of the one or more electronic devices having an application stored thereon, wherein the application is configured to:

cause the one or more processors to activate the electronic device's camera for capturing an image of the unidentified plumbing supply product, wherein the unidentified plumbing supply product is associated with an insurance claim;

cause the camera to capture the image, displayed in the application, of the unidentified plumbing supply product;

cause the one or more processors to transmit from the electronic device, over the communications network to an identification server associated with an insurance provider, the image of the unidentified plumbing supply product;

receive a notification, at the electronic device over the communications network, indicating that the unidentified plumbing supply product has been successfully identified; and in response to receiving the notification that the unidentified plumbing supply product has been successfully identified, cause the one or more processors to display in the application an indication that the unidentified plumbing supply product has been successfully identified.

19. A system for identifying a plurality of unidentified plumbing supply products, the system comprising:

a communication network;

one or more electronic devices, wherein each electronic device comprises one or more processors, a memory coupled to the one or more processors and a camera configured to capture images including at least one of the plurality of unidentified plumbing supply products encoded therein;

one or more servers communicative coupled to the communication network and the one or more electronic devices;

one of the one or more servers having an application stored thereon, wherein the application is configured to:
receive, via the communications network, a plurality of sets of image data encoding an image of one of the plurality of unidentified plumbing supply products therein;
analyze, by the one or more processors, the plurality of sets of image data to generate a plurality of sets of descriptors representative of the plurality of unidentified plumbing supply products, wherein each descriptor is a numerical vector representative of an aspect of a set of image data;
compare, by the one or more processors, the plurality of sets of descriptors to a plurality of stored descriptors;
determine, by the one or more processors, that a particular set of descriptors of the plurality of sets of descriptors does not indicate that a particular unidentified plumbing supply product of the plurality of unidentified plumbing supply products matches a plumbing supply product stored in a plumbing supply product database, wherein the plumbing supply product database includes data representative of a plurality of known plumbing supply products;
generating, by the one or more processors, a request to capture additional identifying information corresponding to the particular unidentified plumbing supply product;
transmitting, via the communications network to the electronic device corresponding to the particular unidentified plumbing supply product, the request to capture the additional identifying information;
receiving, via the communications network, a second set of image data encoding an image of the particular unidentified plumbing supply product therein;
analyzing, by the one or more processors, the second set of image data to generate a second set of descriptors representative of the particular unidentified plumbing supply product; and
determining, by the one or more processors, that the combination of the first and second sets of descriptors indicates that the particular unidentified plumbing supply product is a particular plumbing supply product stored in the plumbing supply product database; and
transmit, via the communication network to the electronic device corresponding to the particular unidentified plumbing supply products, a notification that particular unidentified plumbing supply products has been successfully identified.

* * * * *